(12) United States Patent
Wei et al.

(10) Patent No.: US 9,166,773 B2
(45) Date of Patent: *Oct. 20, 2015

(54) SYSTEM TIMING MARGIN IMPROVEMENT OF HIGH SPEED I/O INTERCONNECT LINKS BY USING FINE TRAINING OF PHASE INTERPOLATOR

(71) Applicant: Intel Corporation, Santa Clara, CA (US)

(72) Inventors: Fangxing Wei, Folsom, CA (US); Subratakumar Mandal, Portland (OA)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/590,928

(22) Filed: Jan. 6, 2015

(65) Prior Publication Data

US 2015/0124916 A1 May 7, 2015

Related U.S. Application Data

(63) Continuation of application No. 13/631,874, filed on Sep. 29, 2012, now Pat. No. 8,929,499.

(51) Int. Cl.
*H04L 7/00* (2006.01)
*H04B 1/16* (2006.01)
*H04L 1/20* (2006.01)
*H04L 7/10* (2006.01)

(52) U.S. Cl.
CPC .............. *H04L 7/0087* (2013.01); *H04B 1/16* (2013.01); *H04L 1/205* (2013.01); *H04L 7/0016* (2013.01); *H04L 7/0025* (2013.01); *H04L 7/10* (2013.01)

(58) Field of Classification Search
CPC ...... H04L 7/0008; H04L 7/0016; H04L 7/002; H04L 7/0025; H04L 7/0029; H04L 27/22; H03L 7/0998; H04B 17/0062
See application file for complete search history.

(56) References Cited

U.S. PATENT DOCUMENTS

| | | | |
|---|---|---|---|
| 6,429,693 | B1 | 8/2002 | Staszewski et al. |
| 6,501,706 | B1 | 12/2002 | West |
| 8,074,126 | B1 * | 12/2011 | Qian et al. ............ 714/704 |
| 2004/0170244 | A1 | 9/2004 | Cranford et al. |
| 2005/0147194 | A1 | 7/2005 | Koenenkamp |
| 2005/0265487 | A1 | 12/2005 | Sou |

(Continued)

FOREIGN PATENT DOCUMENTS

WO 2013/119209 A1 8/2013

OTHER PUBLICATIONS

International Search Report and Written Opinion received for PCT Patent Application No. PCT/US2012/024132, mailed on Oct. 24, 2012, 10 pages.

*Primary Examiner* — Jean B Corrielus
(74) *Attorney, Agent, or Firm* — Alpine Technology Law Group LLC

(57) ABSTRACT

Methods and apparatus for improving system timing margin of high speed I/O (input/output) interconnect links by using fine training of a phase interpolator are described. In some embodiments, I/O links use forward clock architecture to send data from transmit driver to receiver logic. Moreover, at the receiver side, Phase Interpolator (PI) logic may be used to place the sampling clock at the center of the valid data window or eye. In an embodiment, a Digital Eye Width Monitor (DEWM) logic may be used to measure data eye width in real time. Other embodiments are also disclosed.

20 Claims, 10 Drawing Sheets

(56) References Cited

U.S. PATENT DOCUMENTS

| | | |
|---|---|---|
| 2006/0002497 A1 | 1/2006 | Zhang |
| 2006/0103566 A1 | 5/2006 | Vemulapalli et al. |
| 2006/0181319 A1 | 8/2006 | Zhang |
| 2006/0227917 A1 | 10/2006 | Buchwald et al. |
| 2006/0242367 A1 | 10/2006 | Ramakrishnan et al. |
| 2007/0075877 A1 | 4/2007 | Goller et al. |
| 2008/0297213 A1 | 12/2008 | Abbasfar et al. |
| 2009/0202027 A1 | 8/2009 | Yin et al. |
| 2011/0068840 A1 | 3/2011 | Williams et al. |
| 2011/0075781 A1 | 3/2011 | Kenney |
| 2011/0084863 A1 | 4/2011 | Chiu et al. |
| 2011/0274215 A1 | 11/2011 | Hollis |

* cited by examiner

SYSTEM TIMING MARGIN IMPROVEMENT OF HIGH SPEED I/O INTERCONNECT LINKS BY USING FINE TRAINING OF PHASE INTERPOLATOR

FIELD

The present disclosure generally relates to the field of electronics. More particularly, an embodiment of the invention relates to improving system timing margin of high speed I/O (input/output) interconnect links by using fine training of a phase interpolator.

BACKGROUND

In high-speed input/output (I/O or IO) links, an accurate measurement of the eye width of the received signal is critically important. The output of a signal from an I/O circuit transmitter is known commonly as an eye diagram. Eye diagrams help determine system level voltages and timing margins associated with high speed I/O operations; hence, the better the quality of the digital signal transmission, the wider the eye width and eye height.

In some current data eye training techniques, a Phase Interpolator (PI) is used to move the sampling clock to two sides/edges (right and left) of the data eye until a failure is detected. PI control codes for the failing positions may be captured. The average of the right and left edge control codes may determine the eye center. PI may be finally programmed with the average value of the right and left eye edge PI codes to put the sampling clock at the center of data valid window. If PI steps are not uniform, this method of PI training will have an offset to real data center.

However, as process technology improves in dimensions, it becomes very hard to design PI with uniform steps over the operating range of the PI. This causes the trained PI clock to have an offset from the real data eye center. This offset adversely affects the system timing margin and limits the bandwidth of the I/O interconnect.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, some embodiments may be practiced without the specific details. In other instances, well-known methods, procedures, components, and circuits have not been described in detail so as not to obscure the particular embodiments. Various aspects of embodiments of the invention may be performed using various means, such as integrated semiconductor circuits ("hardware"), computer-readable instructions organized into one or more programs ("software") or some combination of hardware and software. For the purposes of this disclosure reference to "logic" shall mean either hardware, software, or some combination thereof.

As process technology improves in dimensions and migrates to digital form (instead of analog), it becomes very hard to design PI with uniform steps over the operating range of the PI. This causes the trained PI clock to have an offset from the real data eye center (e.g., as high as 20 ps in some implementations). This offset adversely affects the system timing margin and limits the bandwidth of the I/O interconnect.

In some embodiments, I/O links (also referred to herein interchangeably as "interconnects" or "interconnect" in singular form) use forward clock architecture to send data from transmit driver to receiver logic. Generally, an forward clock architecture refers to an IO specification like DDR or QPI, which sends a clock with data from transmitter side to receiver side; and, a receiver uses this clock to recover data at the receiver side. Moreover, at the receiver side, Phase Interpolator (PI) logic may be used to place the sampling clock at the center of the valid data window or eye. Usually a training loop is used to train the sampling clock. In an embodiment, a Digital Eye Width Monitor (DEWM) logic is used to measure data eye width in real time. In one embodiment, a PI-based training technique (which is aimed to minimize the training offset significantly) improves I/O data rate of high speed I/O links (e.g., Double Data Rate (DDR) memory interconnects, Peripheral Component Interconnect express (PCIe) interconnects (e.g., in accordance with PCIe Base Specification 3.0, Revision 3.0, November 2010), QPIs (Quick Path Interconnects), OPIO (On-Package IO), etc.) used on Intel Processors or Chipsets.

Figure 1:
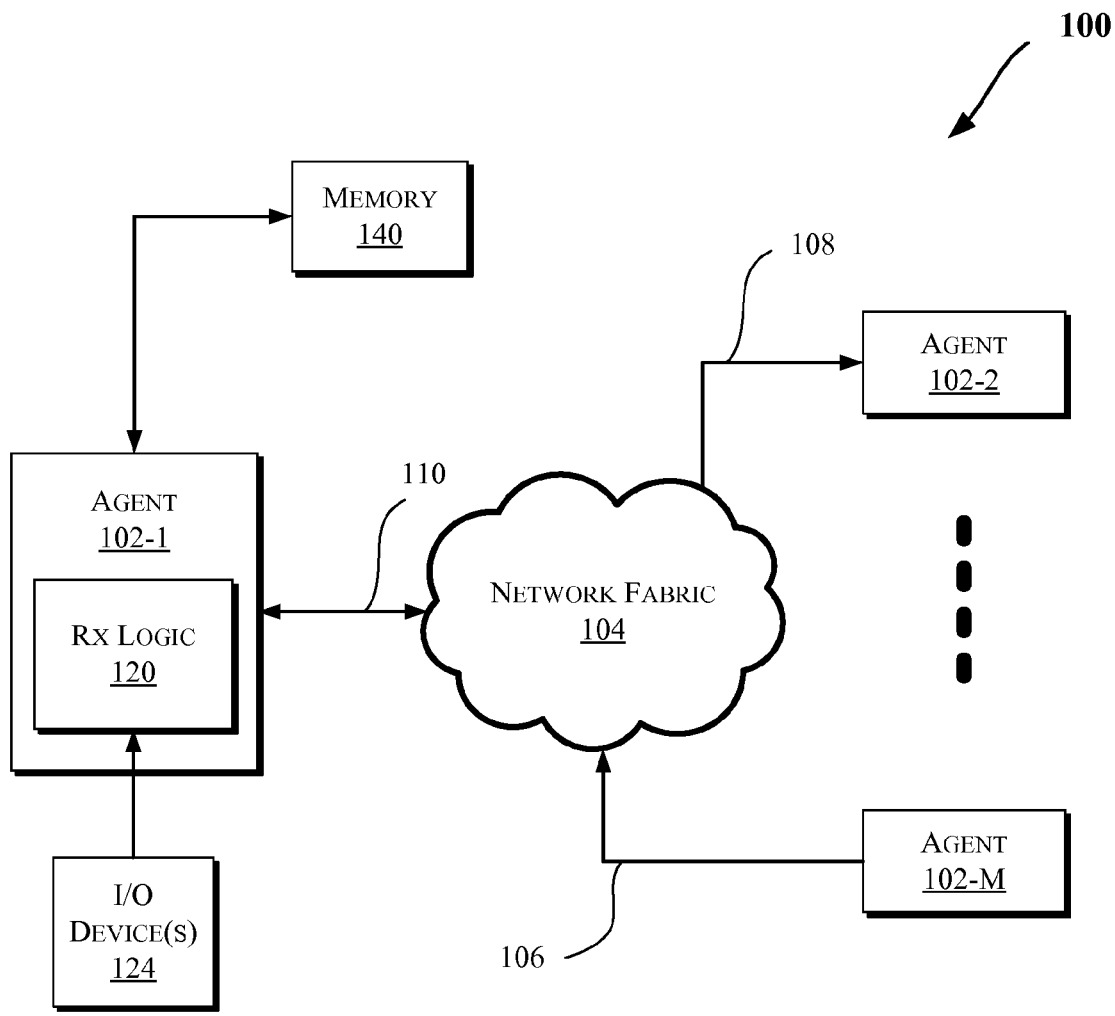
FIGS. 1-2 and 10-11 illustrate block diagrams of embodiments of computing systems, which may be utilized to implement various embodiments discussed herein.

Various embodiments are discussed herein with reference to a computing system component, such as the components discussed herein (such as those used in cell phones, smart phones, tablets, etc.), e.g., with reference to FIGS. 1-2 and 10-11. More particularly, FIG. 1 illustrates a block diagram of a computing system 100, according to an embodiment of the invention. The system 100 includes one or more agents 102-1 through 102-M (collectively referred to herein as "agents 102" or more generally "agent 102"). In an embodiment, the agents 102 are components of a computing system, such as the computing systems discussed with reference to FIGS. 2 and 10-11.

As illustrated in FIG. 1, the agents 102 communicate via a network fabric 104. In an embodiment, the network fabric 104 includes one or more interconnects (or interconnection networks) that communicate via a serial (e.g., point-to-point) link and/or a shared communication network. For example, some embodiments facilitate component debug or validation on links that allow communication with fully buffered dual in-line memory modules (FBD), e.g., where the FBD link is a serial link for coupling memory modules to a host controller device (such as a processor or memory hub). Debug information may be transmitted from the FBD channel host such that the debug information may be observed along the channel by channel traffic trace capture tools (such as one or more logic analyzers).

In one embodiment, the system 100 supports a layered protocol scheme, which includes a physical layer, a link layer, a routing layer, a transport layer, and/or a protocol layer. The fabric 104 further facilitates transmission of data (e.g., in form of packets) from one protocol (e.g., caching processor or caching aware memory controller) to another protocol for a point-to-point network. Also, in some embodiments, the network fabric 104 provides communication that adheres to one or more cache coherent protocols.

Furthermore, as shown by the direction of arrows in FIG. 1, the agents 102 may transmit and/or receive data via the network fabric 104. Hence, some agents may utilize a unidirectional link while others may utilize a bidirectional link for communication. For instance, one or more agents (such as agent 102-M) may transmit data (e.g., via a unidirectional link 106), other agent(s) (such as agent 102-2) may receive data (e.g., via a unidirectional link 108), while some agent(s) (such as agent 102-1) may both transmit and receive data (e.g., via a bidirectional link 110).

Also, in accordance with an embodiment, one or more of the agents 102 include one or more receiver (Rx) logic 120 to facilitate communication between an agent (e.g., agent 102-1 shown) and one or more Input/Output ("I/O" or "IO") devices 124, e.g., by processing data received form the I/O devices 124. There may also be a transmit logic available to the agents 102 (not shown), e.g., to transmit data to the I/O devices 124.

In some embodiments, one or more components of a multi-agent system (such as a processor core, a chipset, an input/output hub, a memory controller, etc.) include the Rx logic 120, as will be further discussed with reference to the remaining figures. Additionally, as illustrated in FIG. 1, the agent 102-1 has access to a memory 140. As will be further discussed herein, the memory 140 may store various items including for example an OS, a device driver, etc.

Figure 2:
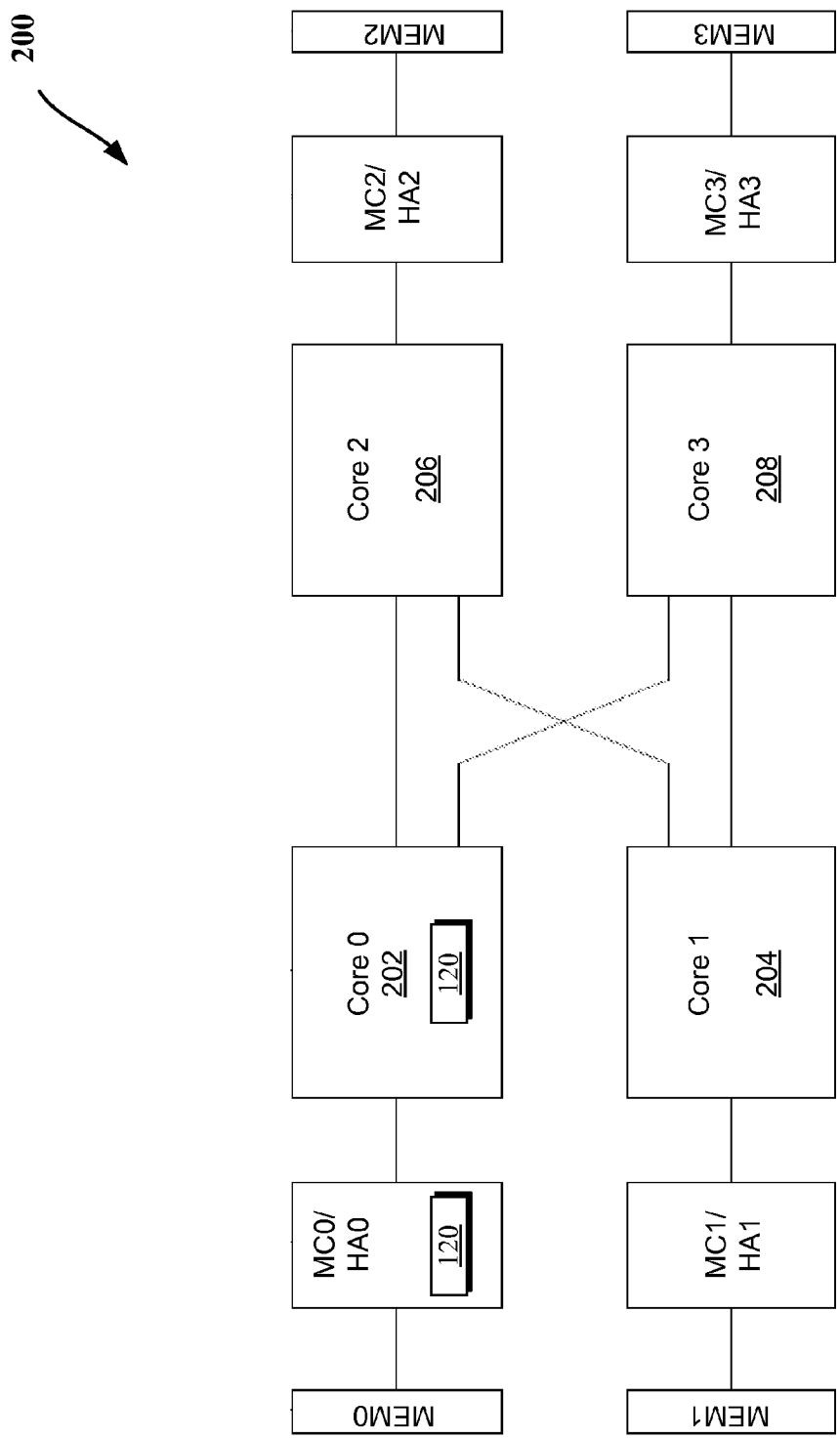

More specifically, FIG. 2 is a block diagram of a computing system 200 in accordance with an embodiment. System 200 includes a plurality of sockets 202-208 (four shown but some embodiments may have more or less socket). Each socket may include a processor and an Rx logic 120. In some embodiments, the Rx logic 120 is present in one or more components of system 200 (such as those shown in FIG. 2).

Additionally, each socket may be coupled to the other sockets via a point-to-point (PtP) link or a differential interconnect, such as a PCIe, Quick Path Interconnect (QPI), MIPI (Mobile Industry Processor Interface), etc. As discussed with respect the network fabric 104 of FIG. 1, each socket may be coupled to a local portion of system memory, e.g., formed by a plurality of Dual Inline Memory Modules (DIMMs) that may include dynamic random access memory (DRAM).

As shown in FIG. 2, each socket is coupled to a Memory Controller (MC)/Home Agent (HA) (such as MC0/HA0 through MC3/HA3). The memory controllers is coupled to a corresponding local memory (labeled as MEM0 through MEM3), which may be a portion of system memory (such as memory 1012 of FIG. 10). In some embodiments, the memory controller (MC)/Home Agent (HA) (such as MC0/HA0 through MC3/HA3) are the same or similar to agent 102-1 of FIG. 1 and the memory, labeled as MEM0 through MEM3, are the same or similar to memory devices discussed with reference to any of the figures herein. Generally, processing/caching agents send requests to a home node for access to a memory address with which a corresponding "home agent" is associated. Also, in one embodiment, MEM0 through MEM3 are configured to mirror data, e.g., as master and slave. Also, one or more components of system 200 are included on the same integrated circuit die in some embodiments.

Furthermore, one implementation (such as shown in FIG. 2) is for a socket glueless configuration with mirroring. For example, data assigned to a memory controller (such as MC0/HA0) is mirrored to another memory controller (such as MC3/HA3) over the PtP links.

Figure 3:
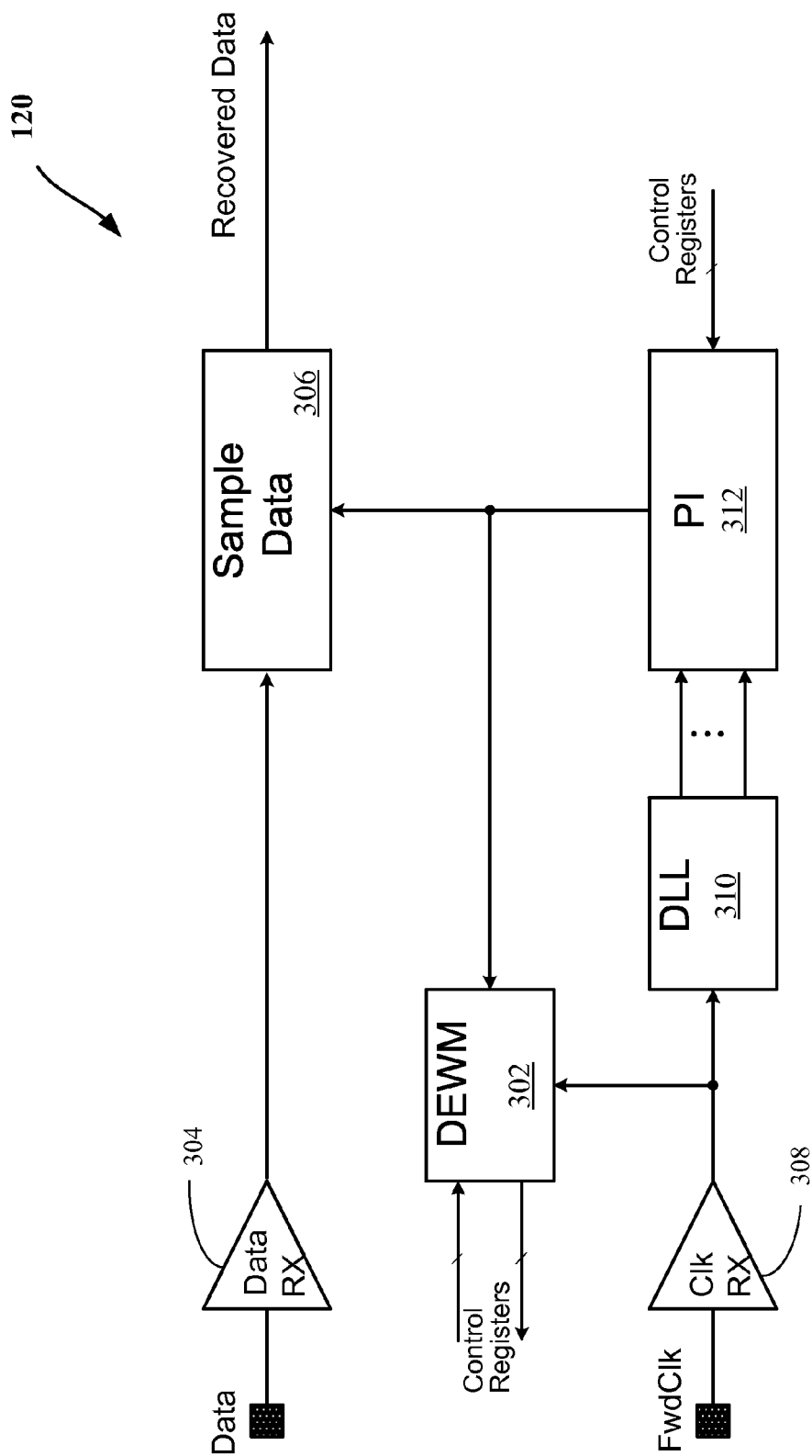
FIG. 3 illustrates a block diagram of the receiver logic, according to an embodiment.
Figure 6:
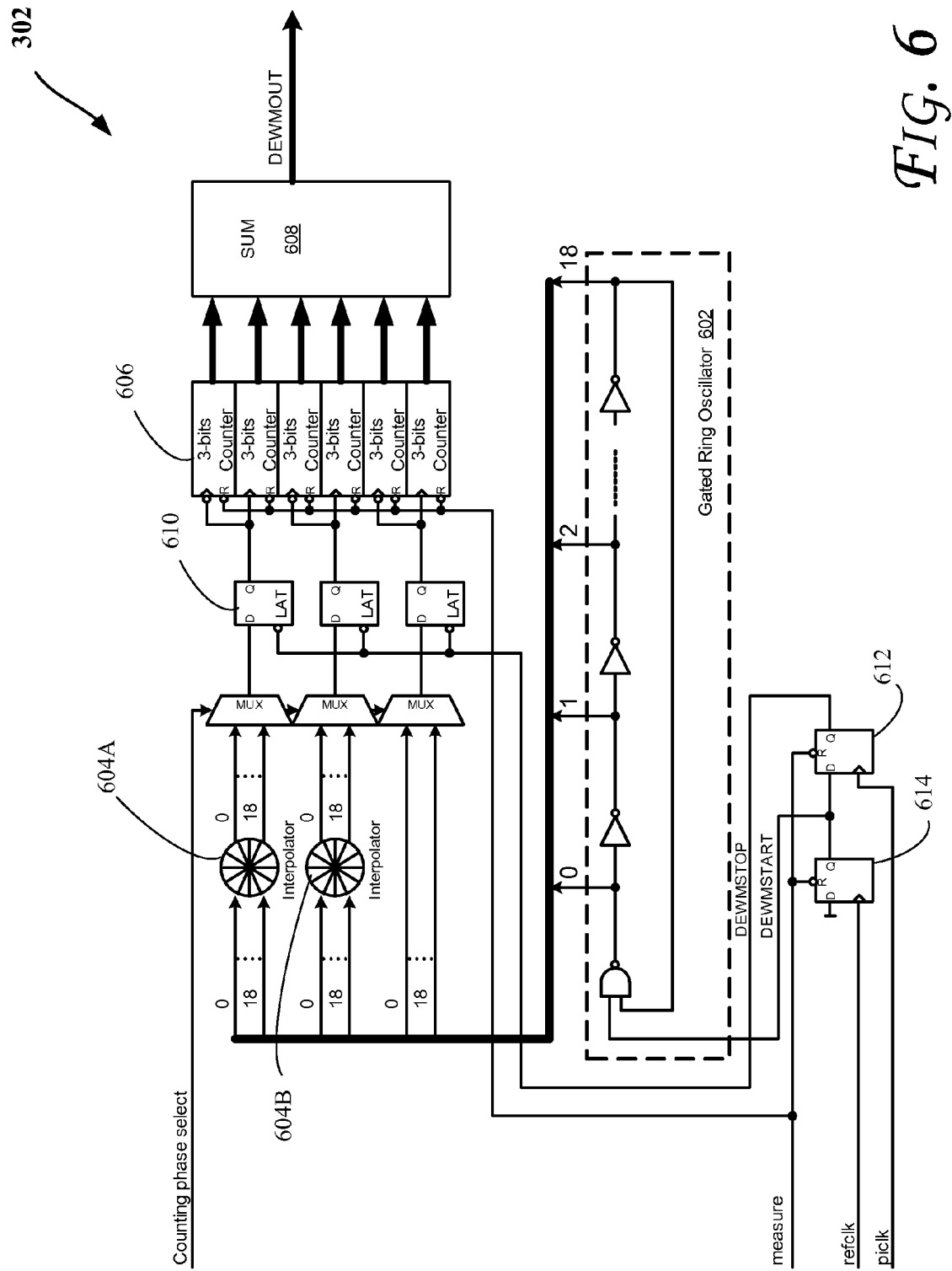
FIG. 6 shows a block diagram of components of the Digital Eye Width Monitor (DEWM) logic of FIG. 3, according to an embodiment.

FIG. 3 illustrates a block diagram of the receiver logic 120, according to an embodiment. In some embodiments, a Digital Eye Width Monitor (DEWM) logic 302 measures data eye width in picoseconds (ps), such as shown in FIG. 6. Since this logic is capable of offering picoseconds range time measurements, method(s) (such as those discussed with reference to FIG. 7 or 9) may use the DEWM logic 302 to minimize offset of the sampling clock which is generated by a PI (e.g., PI clock or PIclk). For example, Phase Interpolators may go through a training process for optimal placement of the sampling clock (sometimes referred to as coarse training). An embodiment adds a layer of training (also referred to as fine training) to minimize the sampling clock offset.

As shown in FIG. 3, data is received at a buffer 304 which is provided to a sample data logic 306, e.g., to sample the received data. A forward clock is also provided to the DEWM and a DLL (Delay Locked Loop) loop 310 (e.g., via a buffer 308). The DLL 310 in turn provides (e.g., uniformly divided) clock phases within one clock cycle to a Phase Interpolator (PI) logic 312, which then provides fine tracking clock steps to the sample data logic 306 and the DEWM logic 302. As shown, logic 302 and logic 312 have access to information stored in control registers, where the stored information includes configuration information for various logic as discussed with reference to FIG. 7 or 9, for example. As shown, received/recovered data is provided from the sample data logic 306, e.g., based on the offset adjustment achieved through the PI 312.

Figure 4:
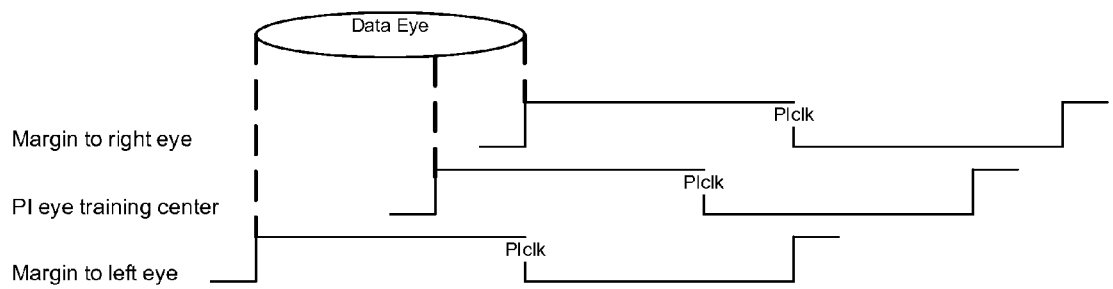
FIGS. 4-5 and 8 illustrate timing diagrams according to some embodiments.
Figure 5:
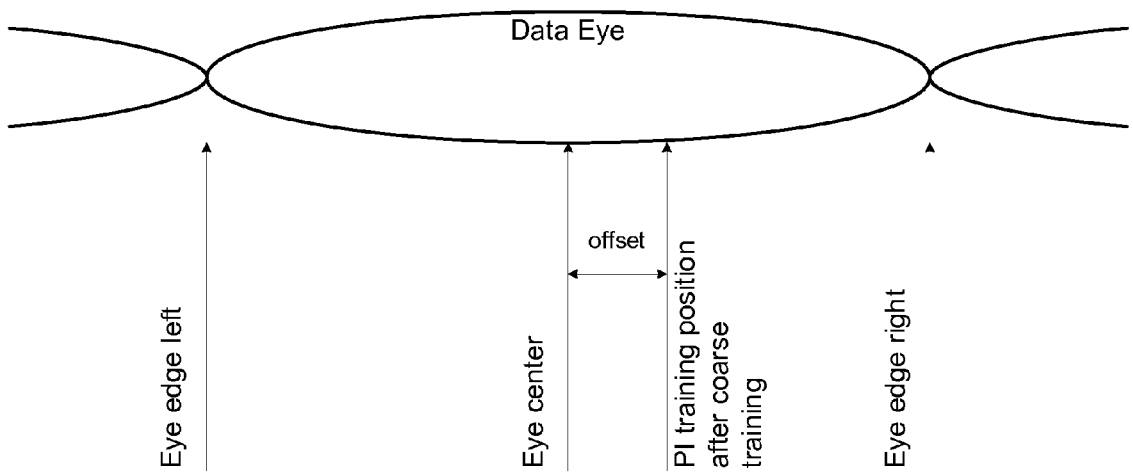

FIG. 4 illustrates a timing diagram associated with data eye training and margining, according to an embodiment. More specifically, FIG. 4 shows the clock training and margining for high speed types of IOs. For some embodiments, the PI step change for a given die is anywhere between 1.7 ps to larger than 7 ps. These numbers may be worse for PI design in more densely populated integrated circuits. This big step variation causes data eye training to have a big offset from real data eye center (e.g., see FIG. 5 which shows the offset associated with data eye training after a coarse training) This will reduce the timing margin budget for receiver side data recovery. "PIclk" refers to a PI clock signal.

FIG. 6 shows a block diagram of components of the DEWM logic 302, according to an embodiment. As shown in FIG. 6, the DEWM logic includes a gated ring oscillator (GRO) 602 and standard cell-based interpolators 604A and 604B (collectively, interpolators 604), to reduce the offset associated with data eye training after a coarse training FIG. 8 shows the DEWM time measurement related to a reference clock, according to an embodiment.

Figure 8:
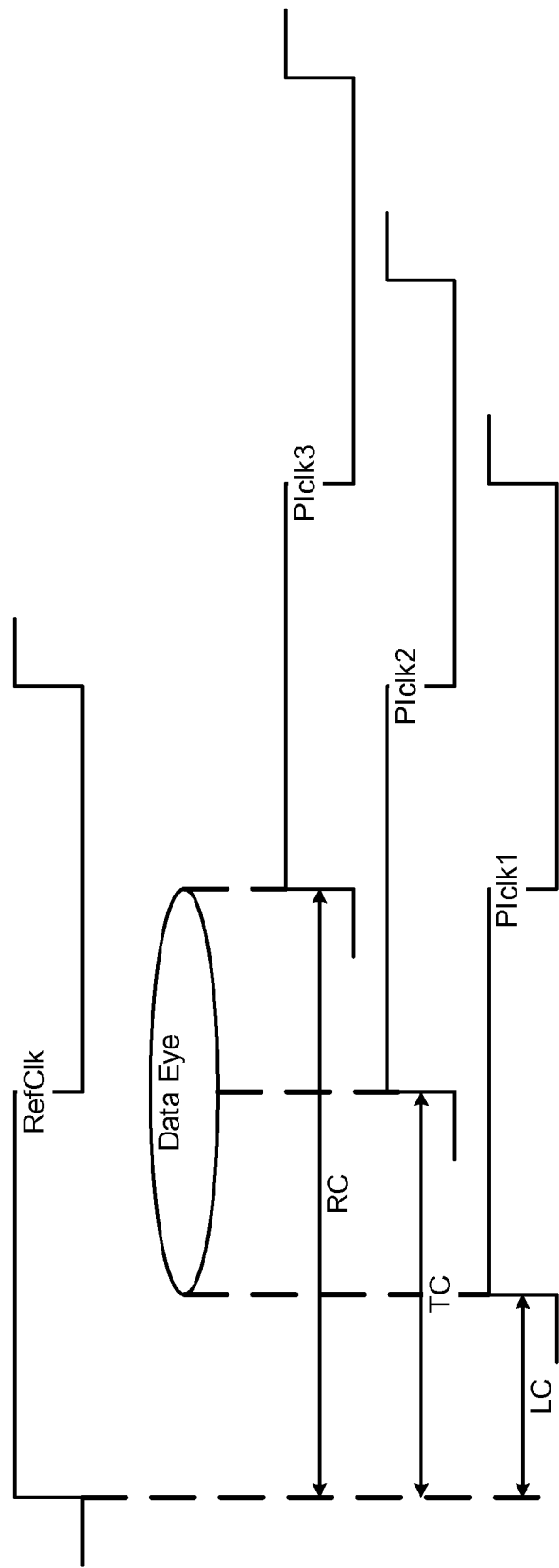

Referring to FIGS. 6 and 8, in some embodiments, the measurement process starts with a calibration cycle, in which the total number of rising and falling clock edges of the GRO 602 during one PiClk cycle is measured. The DEWM 302 uses a reference clock (RefClk) to trigger start for the DEWM logic 302, to start the timing measurement, and uses PiClk to trigger DEWM logic's stop, to finish the time measurement. For example, the DEWM 302 counts all rising and falling clock edges produced by the GRO 602 between the rising edge of RefClk and PiClk1, shown in FIG. 8 as LC. After resetting the DEWM 302, the DEWM 302 counts all rising and falling clock edges produced by the GRO 602 between the rising edge of RefClk and PiClk2, shown as TC in FIG. 8. Finally, after again resetting the DEWM 302, the DEWM 302 counts all rising and falling clock edges produced by the GRO 602 between the rising edge of RefClk and PiClk3, shown as RC in FIG. 8.

To count up all the rising and falling edges between the clocks, the DEWM 302 includes ripple counters 606. The ripple counters 606 count the number of clock rising and falling edges that show up during the time period to be measured, from DEWMstart signal low-to-high transition (triggered by RefClk) to DEWMstop signal low-to-high transition (triggered by PiClk). The DEWM 302 also uses an adder circuit 608 to sum up the total number of rising and falling edges counted by the ripple counters 606. This count number, shown as DEWMout, may be used by some logic (not shown) to determine the left/right eye width. In some embodiments, with different control flow of this logic, the same set of hardware is used to perform clock duty cycle measurement, clock jitter measurement, and phase interpolator linearity check.

In some embodiments, the GRO of the DEWM 302 consists of an odd number of outputs. In the example of FIG. 6, the GRO 602 includes a NAND gate and eighteen inverters. An output precedes each inverter and follows the final inverter, for a total of nineteen outputs, denoted 0, 1, ... 18. These nineteen outputs are received into the standard cell-based interpolators 604. Because of this configuration, the GRO 602 of the DEWM 302 has an odd number of sequential clock phases (the outputs 0, ..., 18).

In some embodiments, the GRO 602 thus guarantees that all GRO clock phases have a deterministic start from a fixed state with a repeatable sequence. This makes it possible to count the number of edges that occurred during the same time period to be measured for each GRO clock phase, using the same set of ripple counters 606 and adder circuit 608. In other words, because the clock phases of the GRO 602 have a deterministic start from a fixed state with a repeatable sequence, some of the hardware may be reused. The logic 302 is thus designed to minimize the on-chip hardware to save silicon costs, yet offer sufficient hardware hooks to perform several different types of measurements, using external software control. The external software/logic control gives flexibility to make a full use of the on-chip hardware resource to other possible applications.

An example of this hardware economy is illustrated in FIG. 6. The GRO 602 has nineteen outputs, labeled 0, ..., 18. In an implementation where the cost and available real estate is not a concern, each of the nineteen outputs of the GRO 602 would be fed into a dedicated pair of phase interpolators 604, which would each generate a new edge from two of the GRO clock phases. These added edges will improve DEWM measurement resolution in some embodiments. Also, in some embodiments, the six ripple counters 606 are shared between the different phases coming out of the GRO 602, rather than having 114 of them (6 ripple counters×19 phases).

In some embodiments, the maximum gate delay inside the GRO 602 is about 6 picoseconds (ps). Thus, in some embodiments, the time measurement resolution is 6 ps. In order to achieve sub-gate delay resolution for performing the time measurements, cell-based phase interpolation is used to further divide down the gate delay, in some embodiments. As shown in FIG. 6, various latches 610-614 may also be used in the DEWM logic 302.

Figure 7:
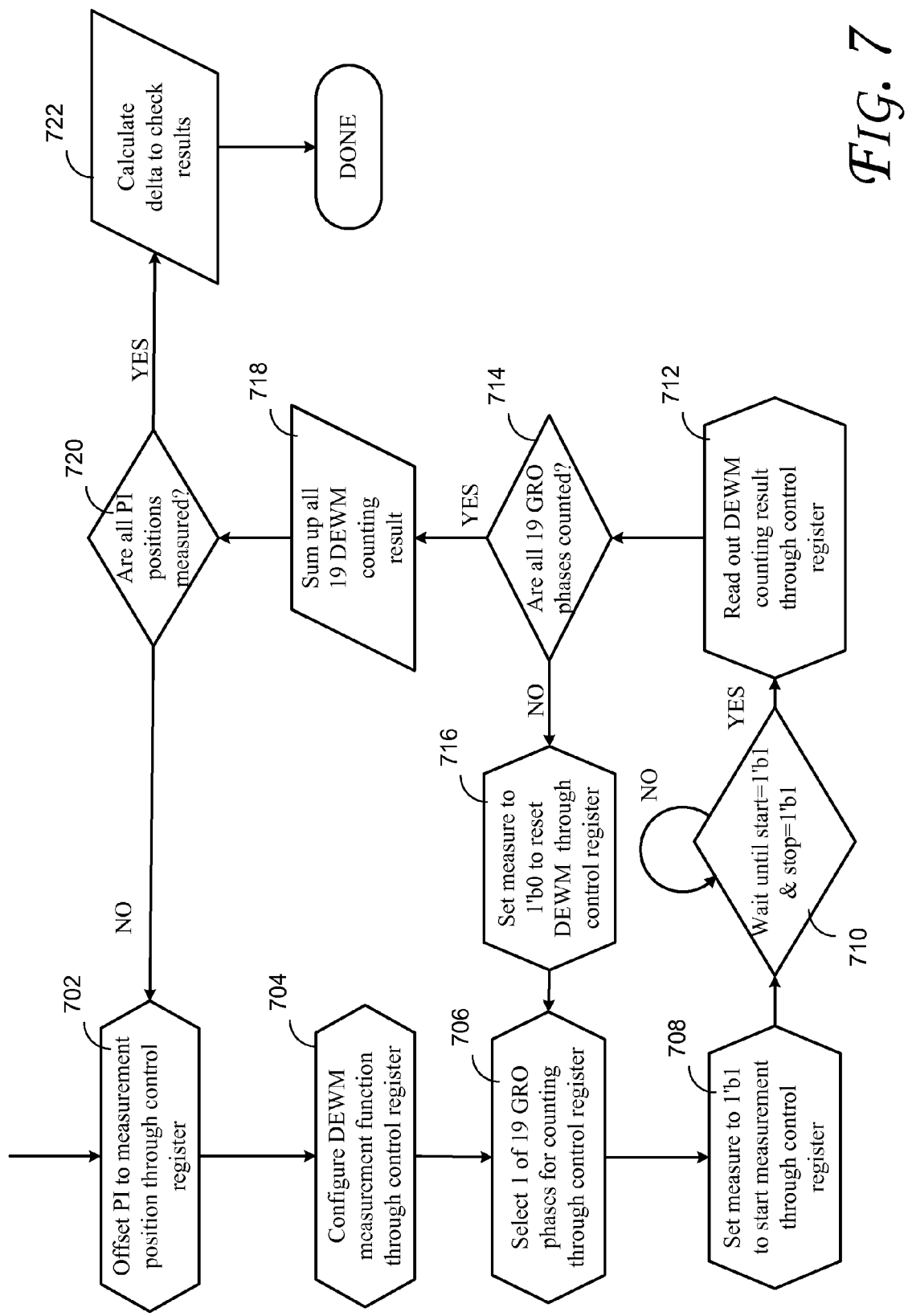
FIGS. 7 and 9 illustrate flow diagrams of methods, according to some embodiments.

FIG. 7 is the flow diagram to operate the DEWM logic 302 to perform time measurements, according to an embodiment. In one embodiment, the DEWM logic 302 measures the eye width with an accuracy of 2 ps or better. Moreover, various components (such as those discussed with reference to FIGS. 1-6 and 8-11) may be used to perform one or more operations of FIG. 7.

Referring to FIG. 6-7, at an operation 702, PI is offset to measurement position through control register(s). At an operation 704, the DEWM logic is configured for measurement function through control register(s). At an operation 706, GRO phases are selected (e.g., by selecting one of 19) for accounting through control register(s). At an operation 708, the measure is set to 1'b1 to start measurement from control register(s). At an operation 710, the DEWM logic waits until start and stop values are reached.

At an operation 712, the DEWM counting results are read out through the control register(s). At an operation 714, it is determined whether all 19 GRO phases have been counted. If not, the measure is set to 1'b0 to reset the DEWM logic through control register(s) at an operation 716. Otherwise, at an operation 718, all 19 DEWM counting results are summed up (e.g., by the adder 608). At an operation 720, it is determined whether all PI positions have been measure. If not, the method resumes with operation 702; otherwise, an operation 722, the delta to check results are calculated/determined.

Figure 9:
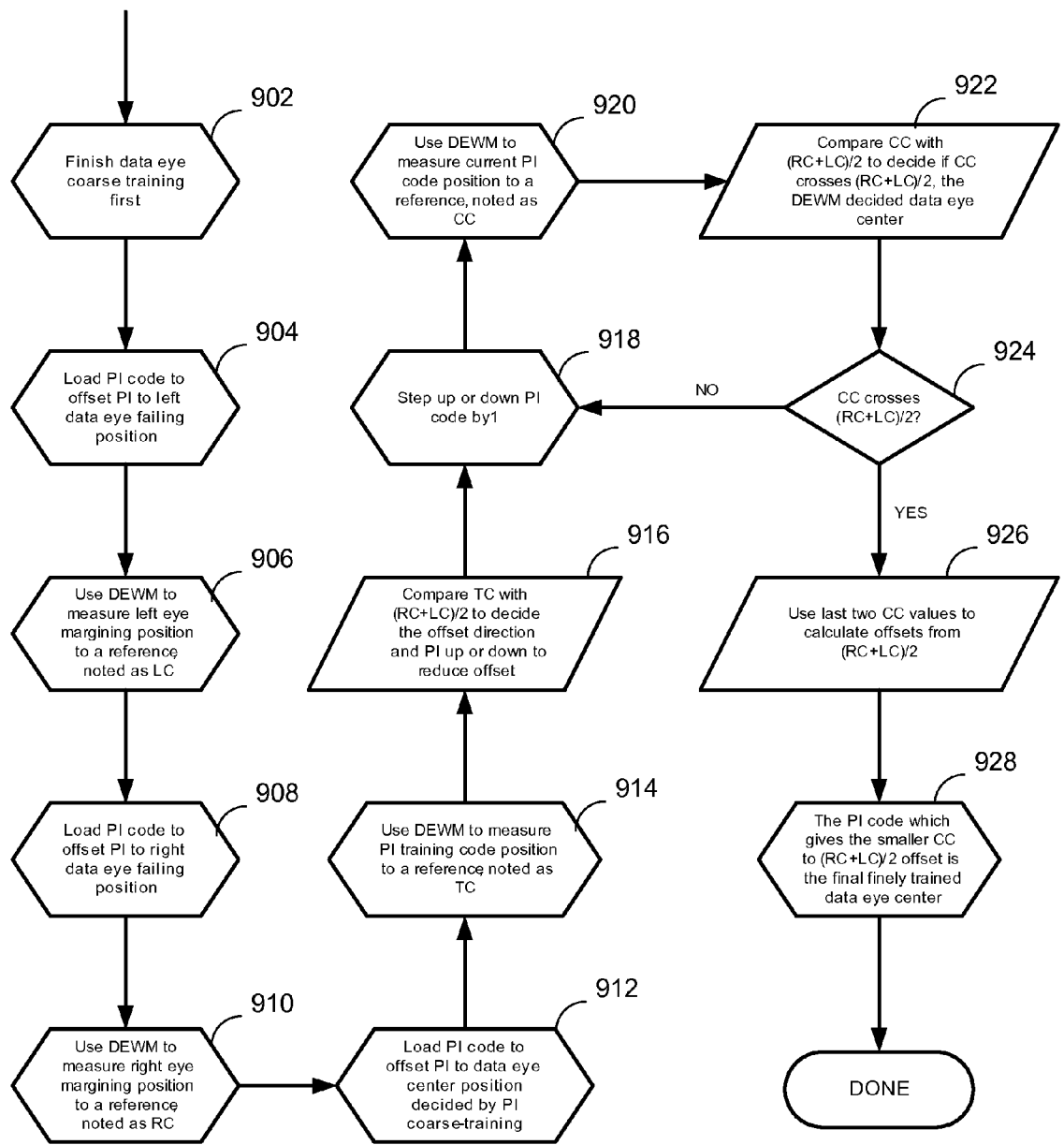

FIG. 9 illustrates a flow diagram to perform PI-based data eye fine training with the DEWM logic 302, according to an embodiment. Moreover, various components (such as those discussed with reference to FIGS. 1-6 and 8-11) may be used to perform one or more operations of FIG. 7.

Referring to FIGS. 6-7 and 9, in an embodiment, data Eye edge sensing based coarse training of PI is completed first at operation 902. At an operation 904, the PI code is changed/loaded to offset PI to left data eye failing position. At an operation 906, the DEWM logic is used to measure the time interval between the failed position and the reference clock (e.g., LC of FIG. 8). At an operation 908, the PI code is changed/loaded to offset PI to right data eye failing position. At an operation 910, the DEWM logic is used to measure the time interval between the failed position and the reference clock (e.g., RC in FIG. 8).

At an operation 912, the PI code is changed/loaded to offset PI to data eye center position decided by PI coarse-training. At an operation 914, the DEWM logic is used to measure time interval between the trained data eye center position and the reference clock. At an operation 916, the offset direction from the above measurement results (e.g., compare TC with (RC+ LC)/2) is determined/calculated to decide the fine training direction. At an operation 918, the PI code is stepped up or down by 1 PI tick based on offset direction to reduce offset (as determined at operation 916).

After each step change at operation 918, the DEWM logic is used to measure the time interval between the new PI training center position and the reference clock at an operation 920. At an operation 922, offset is recalculated/redetermined to check the improvement (e.g., by comparing CC of operation 920 with average of RC and LC).

At an operation 924, it is determined whether the PI clock crosses the DEWM measured data eye center. If so, the method continues with operation 918; otherwise, at an operation 926, the two offsets at left/right of the DEWM measured data eye center are compared to determine which one is smaller. At an operation 928, the PI code which gives the smaller offset is chosen as the final finely trained data eye center.

Figure 10:
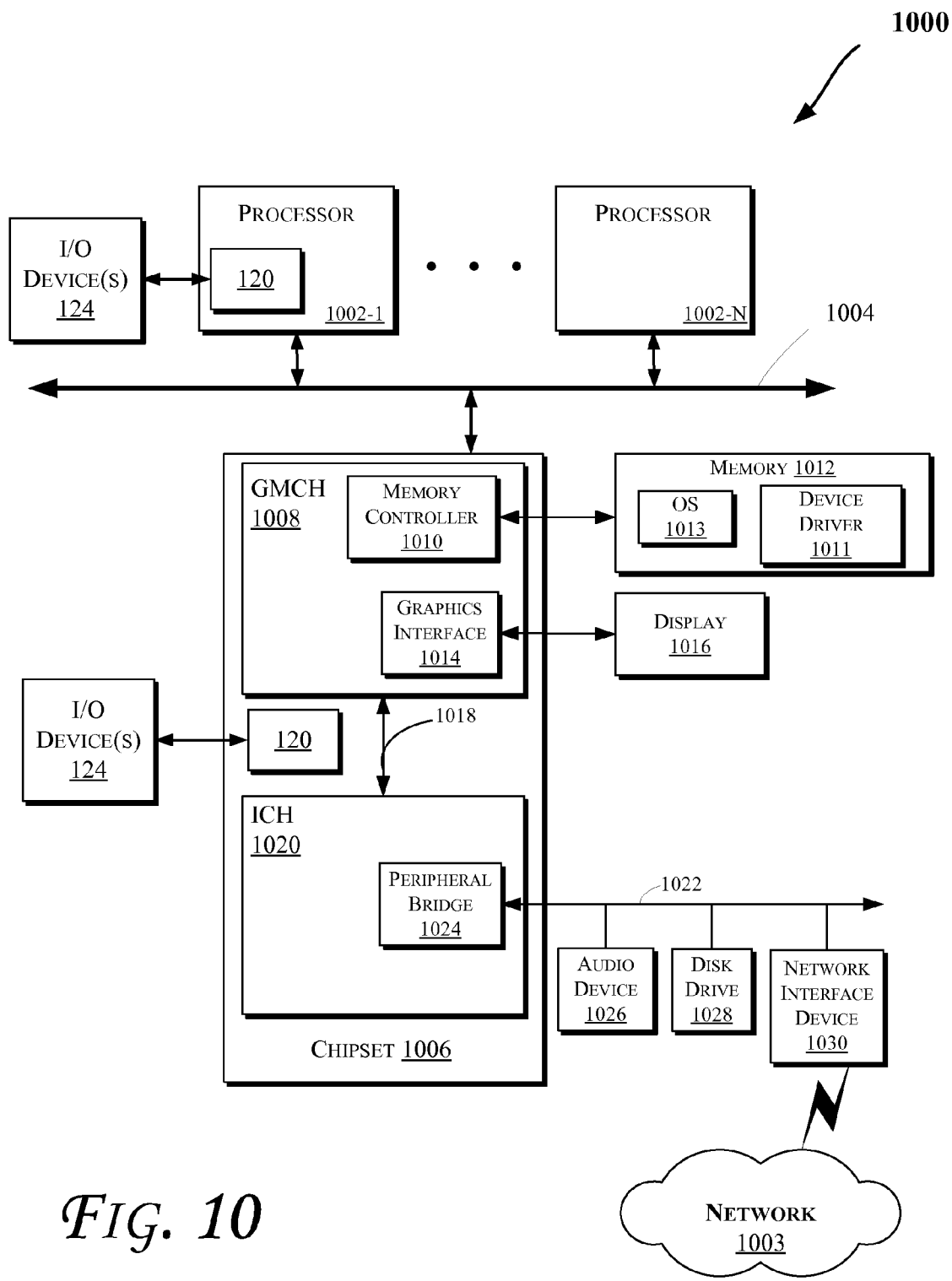

FIG. 10 illustrates a block diagram of a computing system 1000 in accordance with an embodiment of the invention. The computing system 1000 includes one or more central processing unit(s) (CPUs) 1002-1 through 1002-N or processors (collectively referred to herein as "processors 1002" or more generally "processor 1002") that communicate via an interconnection network (or bus) 1004. The processors 1002 includes a general purpose processor, a network processor (that processes data communicated over a computer network 1003), an application processor (such as those used in cell phones, smart phones, tablets, etc.), or other types of a processor (including a reduced instruction set computer (RISC) processor or a complex instruction set computer (CISC)). Moreover, the processors 1002 may have a single or multiple core design. The processors 1002 with a multiple core design may integrate different types of processor cores on the same integrated circuit (IC) die. Also, the processors 1002 with a multiple core design may be implemented as symmetrical or asymmetrical multiprocessors.

Also, the operations discussed with reference to FIGS. 1-9 may be performed by one or more components of the system 1000. In some embodiments, the processors 1002 are the same or similar to the processors 202-208 of FIG. 2. Furthermore, the processors 1002 (or other components of the system 1000) include the Rx logic 120. Moreover, even though FIG. 10 illustrates some locations for the logic 120, it may be located elsewhere in system 1000.

A chipset 1006 also communicates with the interconnection network 1004. The chipset 1006 includes a graphics and memory controller hub (GMCH) 1008. The GMCH 1008 includes a memory controller 1010 that communicates with a memory 1012. The memory 1012 stores data, including sequences of instructions that are executed by the CPU 1002, or any other device included in the computing system 1000. For example, the memory 1012 may store data corresponding to an operation system (OS) 1013 and/or a device driver 1011 as discussed with reference to the previous figures. In an embodiment, the memory 1012 and memory 140 of FIG. 1 are the same or similar. In one embodiment of the invention, the memory 1012 includes one or more volatile storage (or memory) devices such as random access memory (RAM), dynamic RAM (DRAM), synchronous DRAM (SDRAM), static RAM (SRAM), or other types of storage devices. Non-volatile memory may also be utilized such as a hard disk. Additional devices may communicate via the interconnection network 1004, such as multiple CPUs and/or multiple system memories.

Additionally, one or more of the processors 1002 may have access to one or more caches (which may include private and/or shared caches in various embodiments) and associated cache controllers (not shown). The cache(s) may adhere to one or more cache coherent protocols. The cache(s) store data (e.g., including instructions) that are utilized by one or more components of the system 1000. For example, the cache may locally cache data stored in a memory 1012 for faster access by the components of the processors 1002. In an embodiment, the cache (that may be shared) includes a mid-level cache and/or a last level cache (LLC). Also, each processor 1002 may include a level 1 (L1) cache. Various components of the processors 1002 may communicate with the cache directly, through a bus or interconnection network, and/or a memory controller or hub.

The GMCH 1008 also includes a graphics interface 1014 that communicates with a display device 1016, e.g., via a graphics accelerator. In one embodiment of the invention, the graphics interface 1014 communicates with the graphics accelerator via an accelerated graphics port (AGP). In an embodiment of the invention, the display 1016 (such as a flat panel display, a cathode ray tube (CRT), a projection screen, touch screen, etc.) communicates with the graphics interface 1014 through, for example, a signal converter that translates a digital representation of an image stored in a storage device such as video memory or system memory into display signals that are interpreted and displayed by the display 1016. The display signals produced by the display device may pass through various control devices before being interpreted by and subsequently displayed on the display 1016.

A hub interface 1018 allows the GMCH 1008 and an input/output control hub (ICH) 1020 to communicate. The ICH 1020 provides an interface to I/O devices that communicate with the computing system 1000. The ICH 1020 communicates with a bus 1022 through a peripheral bridge (or controller) 1024, such as a peripheral component interconnect (PCI) bridge, a universal serial bus (USB) controller, or other types of peripheral bridges or controllers. The bridge 1024 provides a data path between the CPU 1002 and peripheral devices. Other types of topologies may be utilized. Also, multiple buses may communicate with the ICH 1020, e.g., through multiple bridges or controllers. Moreover, other peripherals in communication with the ICH 1020 include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 1022 communicates with an audio device 1026, one or more disk drive(s) 1028, and a network interface device 1030 (which is in communication with the computer network 1003). Other devices may communicate via the bus 1022. Also, various components (such as the network interface device 1030) communicate with the GMCH 1008 in some embodiments of the invention. In addition, the processor 1002 and one or more components of the GMCH 1008 and/or chipset 1006 may be combined to form a single integrated circuit chip (or be otherwise present on the same integrated circuit die).

Furthermore, the computing system 1000 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 1028), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 11:
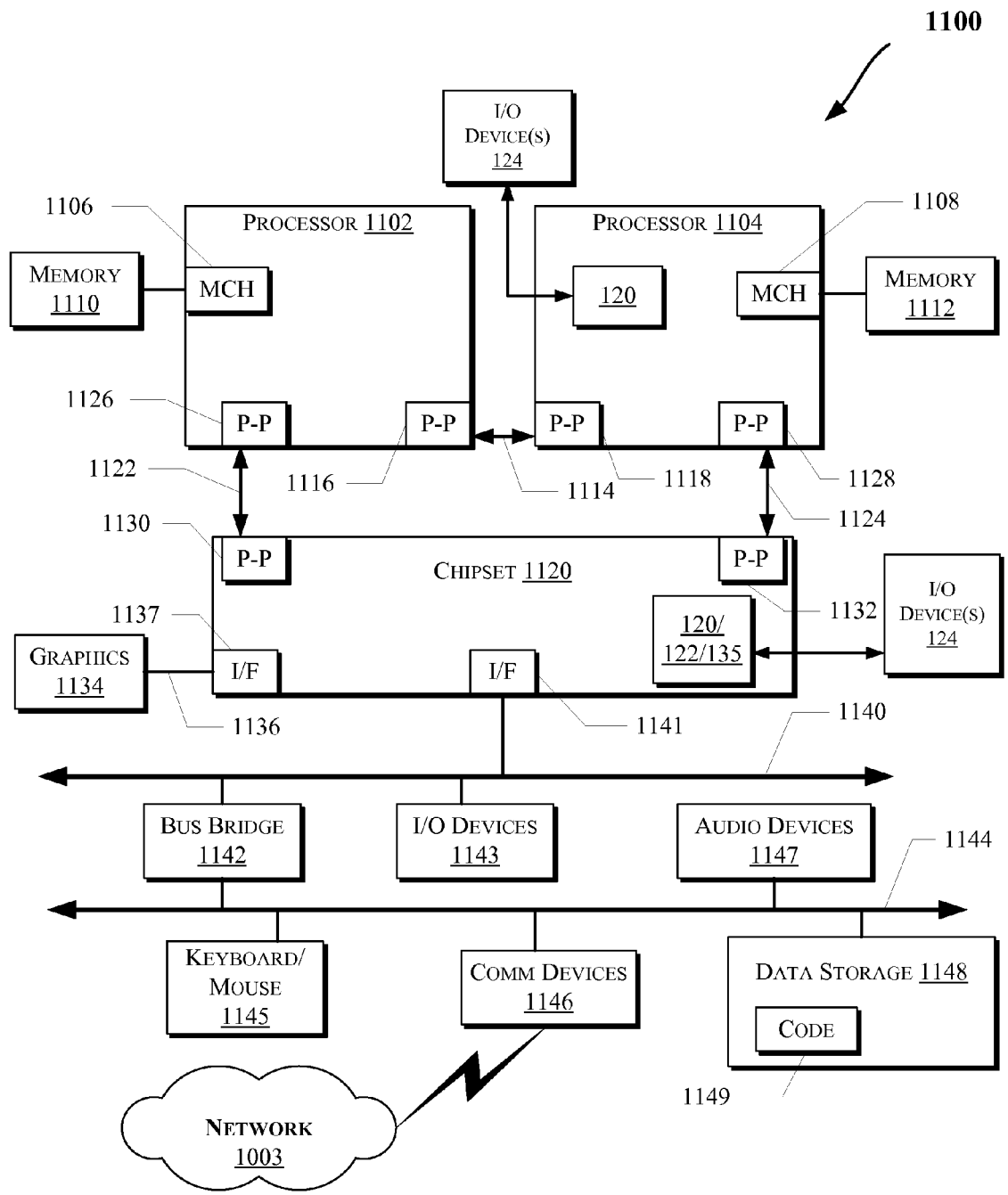

FIG. 11 illustrates a computing system 1100 that is arranged in a point-to-point (PtP) configuration, according to an embodiment of the invention. In particular, FIG. 11 shows a system where processors, memory, and input/output devices are interconnected by a number of point-to-point interfaces. The operations discussed with reference to FIGS. 1-10 may be performed by one or more components of the system 1100.

As illustrated in FIG. 11, the system 1100 includes several processors, of which only two, processors 1102 and 1104 are shown for clarity. The processors 1102 and 1104 each include a local memory controller hub (MCH) 1106 and 1108 to enable communication with memories 1110 and 1112. The memories 1110 and/or 1112 store various data such as those discussed with reference to the memory 1012 of FIG. 10. As shown in FIG. 11, the processors 1102 and 1104 may also include the cache(s) discussed with reference to FIG. 10.

In an embodiment, the processors 1102 and 1104 are one of the processors 1002 discussed with reference to FIG. 10. The processors 1102 and 1104 exchange data via a point-to-point (PtP) interface 1114 using PtP interface circuits 1116 and 1118, respectively. Also, the processors 1102 and 1104 each exchange data with a chipset 1120 via individual PtP interfaces 1122 and 1124 using point-to-point interface circuits 1126, 1128, 1130, and 1132. The chipset 1120 further exchanges data with a high-performance graphics circuit 1134 via a high-performance graphics interface 1136, e.g., using a PtP interface circuit 1137.

At least one embodiment of the invention is provided within the processors 1102 and 1104 or chipset 1120. For example, the processors 1102 and 1104 and/or chipset 1120 may include the Rx logic 120. Other embodiments of the invention, however, may exist in other circuits, logic units, or devices within the system 1100 of FIG. 11. Furthermore, other embodiments of the invention may be distributed throughout several circuits, logic units, or devices illustrated in FIG. 11. Hence, location of item 120 shown in FIG. 11 is exemplary and such components may or may not be provided in the illustrated locations.

The chipset 1120 communicates with a bus 1140 using a PtP interface circuit 1141. The bus 1140 is coupled to one or more devices that communicate with it, such as a bus bridge 1142 and I/O devices 1143. Via a bus 1144, the bus bridge 1142 communicates with other devices such as a keyboard/mouse 1145, communication devices 1146 (such as modems, network interface devices, or other communication devices that communicate with the computer network 1003), audio I/O device, and/or a data storage device 1148. The data storage device 1148 stores code 1149 that may be executed by the processors 1102 and/or 1104.

In various embodiments of the invention, the operations discussed herein, e.g., with reference to FIGS. 1-11, are implemented as hardware (e.g., circuitry), software, firmware, microcode, or combinations thereof, which may be provided as a computer program product, e.g., including a (e.g., non-transitory) machine-readable or (e.g., non-transitory) computer-readable medium having stored thereon instructions (or software procedures) used to program a computer to perform a process discussed herein. Also, the term "logic" may include, by way of example, software, hardware, or combinations of software and hardware. The machine-readable medium may include a storage device such as those discussed with respect to FIGS. 1-11. Additionally, such computer-readable media may be downloaded as a computer program product, wherein the program may be transferred from a remote computer (e.g., a server) to a requesting computer (e.g., a client) by way of data signals transmitted via a carrier wave or other propagation medium via a communication link (e.g., a bus, a modem, or a network connection).

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
   receiver logic, coupled to a first agent, the receiver logic to comprise:
   a phase interpolator to receive a reference clock and to generate a phase interpolator clock;
   Digital Eye Width Monitor (DEWM) logic, at least a portion of which is in hardware, to receive the reference clock and the phase interpolator clock, the DEWM logic to measure a data eye width and to cause a reduction in an offset of the phase interpolator clock relative to a real data eye center,
   wherein the DEWM logic is to cause a reduction in the offset of the phase interpolator clock at least partially based on comparison of two determined offset values at two sides of a center of the measured data eye width.

2. The apparatus of claim 1, wherein the DEWM logic is to comprise a gated ring oscillator to generate an odd number of sequential clock phases having a predetermined gate delay between each sequential clock phase, wherein all sequential clock phases are to have a deterministic start from a fixed state with a repeatable sequence.

3. The apparatus of claim 2, wherein the DEWM logic is to further comprise first and second cell-based interpolators coupled to a first odd-numbered clock phases and a third odd-numbered clock phase of the gated ring oscillator.

4. The apparatus of claim 3, wherein the first and second cell-based interpolators are to generate:
   a first rising edge clock following the first odd-numbered clock phase; and
   a first falling edge clock following the first rising edge clock.

5. The apparatus of claim 4, wherein the DWEM logic is to further comprise third and fourth cell-based interpolators coupled to a first even-numbered clock phases and a second even-numbered clock phase of the gated ring oscillator.

6. The apparatus of claim 5, wherein the third and fourth cell-based interpolators are to generate:
   a second rising clock edge following the first even-numbered clock phase; and
   a second falling clock edge following the second rising clock edge,
   wherein new rising and falling edge clocks to be generated by the cell-based interpolators are to cause the predetermined gate delay of the gated ring oscillator to be about two picoseconds.

7. The apparatus of claim 1, wherein the first agent is to comprise one or more of:
   a processor core, a chipset, an input/output hub, or a memory controller.

8. The apparatus of claim 1, wherein the first agent is to be coupled to an input/output device.

9. The apparatus of claim 1, wherein the first agent is to be coupled to a link.

10. The apparatus of claim 9, wherein the link is to comprise a point-to-point coherent interconnect.

11. The apparatus of claim 9, wherein the link is to comprise a Peripheral Component Interconnect Express (PCIe) link.

12. The apparatus of claim 1, wherein the first agent is to comprise a plurality of processor cores and one or more sockets.

13. The apparatus of claim 1, wherein one or more of the first agent, an input/output device, and memory are on a same integrated circuit chip.

14. A method comprising:
   receiving, at a phase interpolator, a reference clock, the phase interpolator generating a phase interpolator clock;
   receiving, at Digital Eye Width Monitor (DEWM) logic, the reference clock and the phase interpolator clock, the DEWM logic measuring a data eye width and causing a reduction in an offset of the phase interpolator clock relative to a real data eye center,
wherein the DEWM logic causes a reduction in the offset of the phase interpolator clock at least partially based on comparison of two determined offset values at two sides of a center of the measured data eye width.

15. The method of claim 14, further comprising a gated ring oscillator of the DEWM logic generating an odd number of sequential clock phases having a predetermined gate delay between each sequential clock phase, wherein all sequential clock phases have a deterministic start from a fixed state with a repeatable sequence.

16. The method of claim 15, further comprising first and second cell-based interpolators of the DEWM logic generating:
 a first rising edge clock following the first odd-numbered clock phase; and
 a first falling edge clock following the first rising edge clock.

17. The method of claim 16, further comprising third and fourth cell-based interpolators of the DEWM logic generating:
 a second rising clock edge following the first even-numbered clock phase; and
 a second falling clock edge following the second rising clock edge,
wherein new rising and falling edge clocks generated by the cell-based interpolators cause the predetermined gate delay of the gated ring oscillator to be about two picoseconds.

18. A computing system comprising:
 memory to store configuration data for a phase interpolator and Digital Eye Width Monitor (DEWM) logic;
 receiver logic, coupled to a processor core, the receiver logic to comprise:
  a phase interpolator to receive a reference clock and to generate a phase interpolator clock;
  Digital Eye Width Monitor (DEWM) logic, at least a portion of which is in hardware, to receive the reference clock and the phase interpolator clock, the DEWM logic to measure a data eye width and to cause a reduction in an offset of the phase interpolator clock relative to a real data eye center,
 wherein the DEWM logic is to cause a reduction in the offset of the phase interpolator clock at least partially based on comparison of two determined offset values at two sides of a center of the measured data eye width.

19. The system of claim 18, wherein the DEWM logic is to comprise a gated ring oscillator to generate an odd number of sequential clock phases having a predetermined gate delay between each sequential clock phase, wherein all sequential clock phases are to have a deterministic start from a fixed state with a repeatable sequence.

20. The system of claim 19, wherein the DEWM logic is to comprise first and second cell-based interpolators coupled to a first odd-numbered clock phases and a third odd-numbered clock phase of the gated ring oscillator.

* * * * *